US012592611B1

(12) United States Patent
Smith et al.

(10) Patent No.: US 12,592,611 B1
(45) Date of Patent: Mar. 31, 2026

(54) ROTOR ENDPLATE FOR PERMANENT MAGNET MOTOR, ROTOR ASSEMBLY WITH ENDPLATES, MOTOR WITH ROTOR ENDPLATES, AND ELECTRIC COMPRESSOR WITH MOTOR HAVING ENDPLATES

(71) Applicant: MAHLE INTERNATIONAL GMBH, Stuttgart (DE)

(72) Inventors: Tyler Smith, Bath, NY (US); Brett Bowman, Lockport, NY (US)

(73) Assignee: MAHLE INTERNATIONAL GMBH (DE)

( * ) Notice: Subject to any disclaimer, the term of this patent is extended or adjusted under 35 U.S.C. 154(b) by 0 days.

(21) Appl. No.: 19/055,836

(22) Filed: Feb. 18, 2025

(51) Int. Cl.
| | |
|---|---|
| *H02K 7/04* | (2006.01) |
| *F04C 18/02* | (2006.01) |
| *F04C 23/02* | (2006.01) |
| *F04C 29/00* | (2006.01) |
| *F25B 31/02* | (2006.01) |
| *H02K 1/27* | (2022.01) |
| *H02K 1/276* | (2022.01) |
| *H02K 1/28* | (2006.01) |
| *H02K 21/16* | (2006.01) |

(52) U.S. Cl.
CPC ........... *H02K 7/04* (2013.01); *F04C 18/0207* (2013.01); *F04C 23/02* (2013.01); *F04C 29/00* (2013.01); *F25B 31/026* (2013.01); *H02K 1/276* (2013.01); *H02K 1/28* (2013.01); *H02K 21/16* (2013.01); *F04C 2240/30* (2013.01)

(58) Field of Classification Search
CPC ........... H02K 7/04; H02K 1/276; H02K 1/28; H02K 21/16; F04C 18/0207; F04C 23/02; F04C 29/00; F04C 2240/30; F25B 31/026
See application file for complete search history.

(56) References Cited

U.S. PATENT DOCUMENTS

| | | | | |
|---|---|---|---|---|
| 5,476,369 A * | 12/1995 | Fowlkes | .................. | H02K 7/04 |
| | | | | 418/151 |
| 6,291,920 B1 * | 9/2001 | Miller | ................... | F16F 15/322 |
| | | | | 464/180 |
| 6,799,362 B2 * | 10/2004 | Murakami | ............. | H02K 1/276 |
| | | | | 29/598 |

(Continued)

FOREIGN PATENT DOCUMENTS

| | | |
|---|---|---|
| EP | 4020770 A1 | 6/2022 |
| KR | 102609299 B1 | 12/2023 |
| WO | 2024042986 A1 | 2/2024 |

*Primary Examiner* — Dapinder Singh
(74) *Attorney, Agent, or Firm* — Endurance Law Group PLC; James R. Yee

(57) ABSTRACT

An endplate for a rotor assembly of a permanent magnet motor is provided. The endplate includes a base plate, a stiffening portion, and a counterweight portion. The base plate has an outer circumference, an inner circumference and first and second portions. The base plate has a center axis and defines a base plane perpendicular to the center axis. The stiffening portion is coupled to the first portion of the base plate and extends in a direction parallel to the center axis. The stiffening portion extends along the outer circumference of the base plate in the first portion. The counterweight portion is coupled to, and extends from the inner circumference of the base plate toward the center axis and being in the base plane.

20 Claims, 7 Drawing Sheets

(56) References Cited

U.S. PATENT DOCUMENTS

| | | | |
|---|---|---|---|
| 6,965,186 | B2 | 11/2005 | Fukuda et al. |
| 10,954,944 | B2 * | 3/2021 | Seibel ................. F04C 29/0085 |
| 11,245,297 | B2 | 2/2022 | Hung et al. |
| 11,303,168 | B2 | 4/2022 | Sakai et al. |
| 11,581,764 | B2 | 2/2023 | Bowman et al. |
| 2006/0133944 | A1 * | 6/2006 | Doepker ............. F04C 18/0215 |
| | | | 418/55.1 |
| 2024/0088733 | A1 | 3/2024 | Yamada |

* cited by examiner

ROTOR ENDPLATE FOR PERMANENT MAGNET MOTOR, ROTOR ASSEMBLY WITH ENDPLATES, MOTOR WITH ROTOR ENDPLATES, AND ELECTRIC COMPRESSOR WITH MOTOR HAVING ENDPLATES

TECHNICAL FIELD

The present invention is related to permanent magnet motors, and more particularly to a rotor assembly of a permanent magnet motor with a pair of endplates.

BACKGROUND OF THE INVENTION

Compressors have long been used in cooling systems. In particular, scroll-type compressors, in which an orbiting scroll is rotated in a circular motion relative to a fixed scroll to compress a refrigerant, have been used in systems designed to provide cooling in specific areas. For example, such scroll-type compressors have long been used in the HVAC systems of motor vehicles, such as automobiles, to provide air-conditioning. Such compressors may also be used, in reverse, in applications requiring a heat pump. Generally, these compressors are driven using rotary motion derived from the automobile's engine.

With the advent of battery-powered or electric vehicles and/or hybrid vehicles, in which the vehicle may be solely powered by a battery at times, such compressors must be driven or powered by the battery rather than an engine. Such compressors may be referred to as electric compressors.

Electric compressors may include a motor, such as a brushless motor to drive the orbiting scroll or other compression device. Such motors include a rotor that are operated or rotated at speeds below their specific natural frequency and require counterweights for balancing the moving parts of a compressor mechanism. The counterweights act to reduce vibrations and stress caused by unbalance. The counterweights may be attached to the rotor itself or to the shaft driven by the rotor.

The rotor of a brushless motor may be composed of a stack of ferromagnetic sheets alternating with insulating layers. Permanent magnets may be inserted in slots formed in the stack. Typically, the stack is held together by non-ferrous end plates secured by fastening pins that extend through the end plates and the stack from end to end in an axial direction. The unbalance of a compressor mechanism depends on the overall geometry of the rotor assembly including all parts rotating with the shaft, for example, an orbiting scroll.

While counterweights are thus necessary for balancing the moving parts of a compressor mechanism, they also occupy valuable packaging space, especially in automotive vehicles where packaging space is very limited.

The present invention is aimed at one or more of the problems identified above.

BRIEF SUMMARY OF THE INVENTION

In a first aspect of the present invention, an endplate for a rotor assembly of a permanent magnet motor is provided. The endplate includes a base plate, a stiffening portion, and a counterweight portion. The base plate has an outer circumference, an inner circumference and first and second portions. The base plate has a center axis and defines a base plane perpendicular to the center axis. The stiffening portion is coupled to the first portion of the base plate and extends in a direction parallel to the center axis. The stiffening portion extends along the outer circumference of the base plate in the first portion. The counterweight portion is coupled to, and extending from the inner circumference of the base plate in the second portion toward the center axis and is in the base plane.

In a second aspect of the present invention, a rotor assembly for a permanent magnet motor. The rotor assembly includes a rotor and a pair of endplates at opposite axial ends of the rotor. Each endplate includes a base plate, a stiffening portion, and a counterweight portion. The base plate has an outer circumference, an inner circumference and first and second portions. The base plate has a center axis and defines a base plane perpendicular to the center axis. The stiffening portion is coupled to the first portion of the base plate and extends in a direction parallel to the center axis. The stiffening portion extends along the outer circumference of the base plate in the first portion. The counterweight portion is coupled to, and extending from the inner circumference of the base plate in the second portion toward the center axis and is in the base plane.

In a third aspect of the present invention, a permanent magnet motor is provided. The permanent magnet motor includes a housing, a rotor, a stator and a pair of endplates. Each endplate includes a base plate, a stiffening portion, and a counterweight portion. The base plate has an outer circumference, an inner circumference and first and second portions. The base plate has a center axis and defines a base plane perpendicular to the center axis. The stiffening portion is coupled to the first portion of the base plate and extends in a direction parallel to the center axis. The stiffening portion extends along the outer circumference of the base plate in the first portion. The counterweight portion is coupled to, and extending from the inner circumference of the base plate in the second portion toward the center axis and is in the base plane.

In a fourth aspect of the present invention, an electric scroll compressor configured to compress a refrigerant is provided. The electric scroll compressor includes a housing, a refrigerant inlet port, a refrigerant outlet port, a permanent magnet motor, a drive shaft, and a compression device. The housing defines an intake volume and a discharge volume. The refrigerant inlet port is coupled to the housing and is configured to introduce the refrigerant to the intake volume. The refrigerant outlet port is coupled to the housing and is configured to allow compressed refrigerant to exit the electric scroll compressor from the discharge volume. The permanent magnet motor is mounted inside the housing. The permanent magnet motor includes a rotor, a stator, and a pair of endplates at opposite axial ends of the rotor. The rotor is rotarily coupled to the housing. The stator is fixedly coupled to the housing. Each endplate includes a base plate, a stiffening portion, and a counterweight portion. The base plate has an outer circumference, an inner circumference and first and second portions. The base plate has a center axis and defines a base plane perpendicular to the center axis. The stiffening portion is coupled to the first portion of the base plate and extends in a direction parallel to the center axis. The stiffening portion extends along the outer circumference of the base plate in the first portion. The counterweight portion is coupled to, and extending from the inner circumference of the base plate in the second portion toward the center axis and is in the base plane. The drive shaft is coupled to the rotor. The compression device is coupled to the drive shaft and is configured to receive the refrigerant from the intake volume and compress the refrigerant as the drive shaft is rotated by the motor.

CLAUSES

1. An endplate for a rotor assembly of a permanent magnet motor, comprising:
a base plate having an outer circumference, an inner circumference and first and second portions, the base plate having a center axis and defining a base plane perpendicular to the center axis;
a stiffening portion coupled to the first portion of the base plate and extending in a direction parallel to the center axis, the stiffening portion extends along the outer circumference of the base plate in the first portion; and,
a counterweight portion coupled to, and extending from the inner circumference of the base plate in the second portion toward the center axis and being in the base plane.
2. The endplate, as set forth in clause 1, wherein the rotor assembly includes a rotor, wherein the first portion and the second portion including at least one aperture configured to receive a fastener for mounting the endplate to the rotor.
3. The endplate, as set forth in clause 2, wherein the second portion includes a flat surface for accepting a counterweight.
4. The endplate, as set forth in clause 3, wherein the stiffening portion and the counterweight portion are integral with the base plate, wherein the base plate, the stiffening portion, and the counterweight portion are formed from a sheet material using a stamping process.
5. The endplate, as set forth in clause 3, wherein the first portion of the base plate has an angular range of less than 180 degrees.
6. A rotor assembly for a permanent magnet motor, comprising:
a rotor;
a pair of endplates at opposite axial ends of the rotor, each endplate including:
   a base plate having an outer circumference, an inner circumference and first and second portions, the base plate having a center axis and defining a base plane perpendicular to the center axis;
   a stiffening portion coupled to the first portion of the base plate and extending in a direction parallel to the center axis, the stiffening portion extends along the outer circumference of the base plate in the first portion;
   a counterweight portion coupled to, and extending from the inner circumference of the base plate in the second portion toward the center axis and being in the base plane.
7. The rotor assembly, as set forth in clause 6, wherein the first portion and the second portion including at least one aperture configured to receive a fastener for mounting the endplate to the rotor.
8. The rotor assembly, as set forth in clause 7, wherein each second portion includes a flat surface, the rotor assembly further including a pair of counterweights, each counterweight being mounted to a respective endplate adjacent the flat portion.
9. The rotor assembly, as set forth in clause 8, wherein the stiffening portion and the counterweight portion are integral with the base plate, wherein the base plate, the stiffening portion, and the counterweight portion are formed from a sheet material using a stamping process.
10. The rotor assembly, as set forth in clause 8, wherein the first portion of the base plate has an angular range of less than 180 degrees.

11. A permanent magnet motor, comprising:
a housing;
a rotor rotarily coupled to the housing;
a stator fixedly coupled to the housing;
a pair of endplates at opposite axial ends of the rotor, each endplate including:
   a base plate having an outer circumference, an inner circumference and first and second portions, the base plate having a center axis and defining a base plane perpendicular to the center axis;
   a stiffening portion coupled to the first portion of the base plate and extending in a direction parallel to the center axis, the stiffening portion extends along the outer circumference of the base plate in the first portion;
   a counterweight portion coupled to, and extending from the inner circumference of the base plate in the second portion toward the center axis and being in the base plane.
12. The permanent magnet motor, as set forth in clause 11, wherein the first portion and the second portion including at least one aperture configured to receive a fastener for mounting the endplate to the rotor.
13. The permanent magnet motor, as set forth in clause 12, wherein each second portion includes a flat surface, the permanent magnet motor including a pair of counterweights, each counterweight being mounted to a respective endplate adjacent the flat portion.
14. The permanent magnet motor, as set forth in clause 13, wherein the stiffening portion and the counterweight portion are integral with the base plate, wherein the base plate, the stiffening portion, and the counterweight portion are formed from a sheet material using a stamping process
15. The permanent magnet motor, as set forth in clause 13, wherein the first portion of the base plate has an angular range of less than 180 degrees.
16. An electric scroll compressor configured to compress a refrigerant, comprising:
a housing defining an intake volume and a discharge volume;
a refrigerant inlet port coupled to the housing and configured to introduce the refrigerant to the intake volume;
a refrigerant outlet port coupled to the housing and configured to allow compressed refrigerant to exit the electric scroll compressor from the discharge volume;
a permanent magnet motor mounted inside the housing, the permanent magnet motor including:
   a rotor rotarily coupled to the housing;
   a stator fixedly coupled to the housing;
   a pair of endplates at opposite axial ends of the rotor, each endplate including:
      a base plate having an outer circumference, an inner circumference and first and second portions, the base plate having a center axis and defining a base plane perpendicular to the center axis;
      a stiffening portion coupled to the first portion of the base plate and extending in a direction parallel to the center axis, the stiffening portion extends along the outer circumference of the base plate in the first portion;

a counterweight portion coupled to, and extending from the inner circumference of the base plate in the second portion toward the center axis and being in the base plane; and, a drive shaft coupled to the rotor; and, a compression device coupled to the drive shaft and configured to receive the refrigerant from the intake volume and to compress the refrigerant as the drive shaft is rotated by the motor.

17. The electric scroll compressor, as set forth in clause 16, wherein the first portion and the second portion including at least one aperture configured to receive a fastener for mounting the endplate to the rotor.

18. The electric scroll compressor, as set forth in clause 17, wherein each second portion includes a flat surface, the permanent magnet motor including a pair of counterweights, each counterweight being mounted to a respective endplate adjacent the flat portion.

19. The electric scroll compressor, as set forth in clause 18, wherein the stiffening portion and the counterweight portion are integral with the base plate, wherein the base plate, the stiffening portion, and the counterweight portion are formed from a sheet material using a stamping process 20. The electric scroll compressor, as set forth in clause 18, wherein the first portion of the base plate has an angular range of less than 180 degrees.

BRIEF DESCRIPTION OF THE SEVERAL VIEWS OF THE DRAWINGS

These and other features and advantages of the present invention will become more readily appreciated when considered in connection with the following detailed description and appended drawings.

DETAILED DESCRIPTION OF THE INVENTION

With reference to the drawings, and in operation, the present invention is related to a permanent magnet motor 54 which may be utilized an electric compressor 10, for example, an electric scroll compressor.

Figure 1:
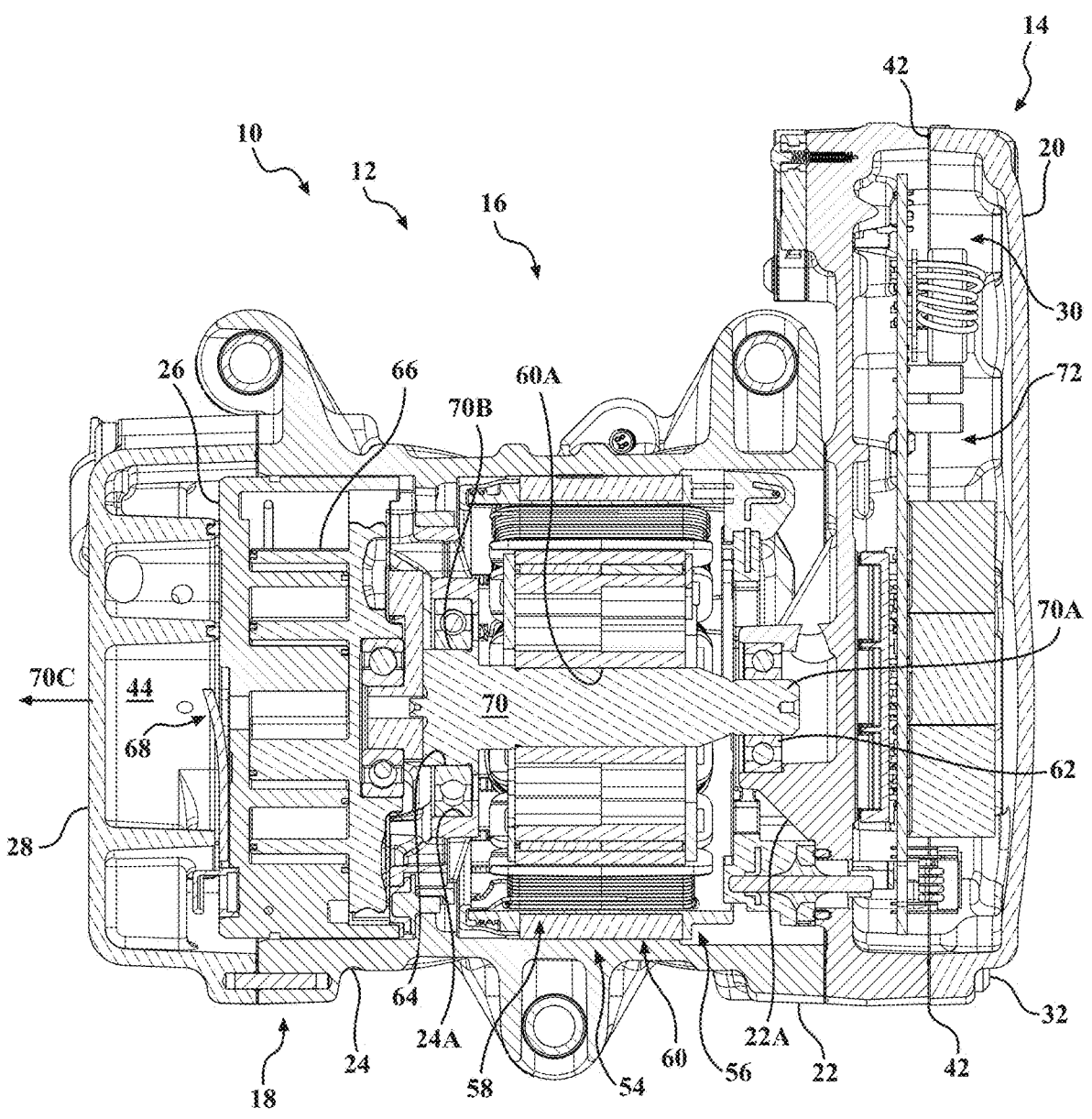
FIG. 1 is a cross-sectional view of an electric compressor according to an embodiment of the present invention.

With particular reference to FIG. 1, the electric compressor 10 has an outer housing 12 The electric compressor 10 may be particularly suitable in a motor vehicle, such as an automotive vehicle (not shown). The electric compressor 10 may be used as a cooling device or as a heating pump to heat and/or cool different aspects of the vehicle. For instance, the electric compressor 10 may be used as part of the heating, ventilation and air conditioning (HVAC) system in electric vehicles (not shown) to cool or heat a passenger compartment. In addition, the electric compressor 10 may be used to heat or cool the passenger compartment, on-board electronics and/or a battery used for powering the vehicle while the vehicle is not being operated, for instance, during a charging cycle. The electric compressor 10 may further be used while the vehicle is not being operated and while the battery is not being charged to maintain, or minimize the degradation, of the life of the battery.

In the illustrated embodiment, the electric compressor 10 is a scroll-type compressor acts to compress a refrigerant rapidly and efficiently for use in different systems of a motor vehicle, for example, an electric or a hybrid vehicle. With specific reference to FIG. 1, the electric compressor 10 includes an inverter section 14, a motor section 16, and a compression device (or compression assembly) 18 contained within the outer housing 12. The outer housing 12 includes an inverter back cover 20, an inverter housing 22 and a center housing 24 (which may be integral), a rear head 28 (which may be referred to as the discharge head). The center housing 24 houses the motor section 16 and the compression device 18.

In one embodiment, the inverter back cover 20, the inverter housing 22, the center housing 24, and the rear head 28 are composed from machined aluminum. The inverter 10 may be mounted, for example, within the body of a motor vehicle, via a plurality of mount points (not shown).

In the illustrated embodiment, the inverter back cover 20 and the inverter housing 22 form an inverter cavity 30. The inverter back cover 20 is mounted to the inverter housing 22 by a plurality of bolts 32. An inverter gasket 42, positioned between the inverter back cover 20 and the inverter housing 22 keeps moisture, dust, and other contaminants from the inverter cavity 30.

An inverter module 72 mounted within the inverter cavity 30 formed by the inverter back cover 20 and the inverter housing 22. The inverter module 72 may include an inverter circuit (not shown) mounted on a printed circuit board (not shown), which is mounted to the inverter housing 22. The inverter circuit converts direct current (DC) electrical power received from outside of the electric compressor 10 into three-phase alternating current (AC) power to supply/power a motor 54 (see below). The inverter circuit may also control the rotational speed of the electric compressor 10. High voltage DC current is supplied to the inverter circuit via a high voltage connector (not shown). Low voltage DC current to drive the inverter circuit, as well as control signals to control operation of the inverter circuit, and the motor section 16, may be supplied via a low voltage connecter (not shown).

The center housing 24 forms a motor cavity 56. The motor section 16 includes a motor 54 located within the motor cavity 56. With specific reference to FIG. 12, in the illustrated embodiment, the motor 54 is a three-phase AC motor having a stator 56. The stator 56 has a generally hollow cylindrical shape with six individual coils (two for each phase). The stator 56 is contained within, and mounted to, the motor housing 22 and remains stationery relative to the motor housing 22.

The motor 54 includes a rotor 60 located within, and centered relative to, the stator 58. The rotor 60 has a generally hollow cylindrical shape and is located within the stator 56.

A drive shaft 70 is coupled to the rotor 60 and rotates therewith. In the illustrated embodiment, the draft shaft 90 is press-fit within a center aperture 60A of the rotor 60. The drive shaft 70 has a first end 70A and a second end 70B. The inverter housing 22 includes a first drive shaft supporting member 22A located on the motor side of the inverter housing 22. A first ball bearing 62 located within an aperture formed by the first drive shaft supporting member 22A supports and allows the first end of the drive shaft 70 to rotate. The center housing 24 includes a second drive shaft supporting member 24A. A second ball bearing 64 located within an aperture formed by the second drive shaft supporting member 24A allows the second end 70B of the drive shaft 70 to rotate. In the illustrated embodiment, the first and second ball bearing 62, 64 are press-fit with the apertures formed by the first drive shaft supporting member 22 of the inverter housing 22 and the second drive shaft supporting member 24A of the center housing 24, respectively.

As stated above, the electric compressor 10 is a scroll-type compressor. The compression device 18 includes the fixed scroll 26 and an orbiting scroll 66. The orbiting scroll 66 is fixed to the second end 70B of the drive shaft 70. The rotor 60 with the drive shaft 70 rotate to drive the orbiting scroll 66 motion under control of the inverter module 72.

The drive shaft 70 has a central axis 70C around which the rotor 60 and the drive shaft 70 are rotated. The orbiting scroll 66 moves about the central axis 70C in an eccentric orbit, i.e., in a circular motion while the orientation of the orbiting scroll 66 remains constant with respect to the fixed scroll 26. The center of the orbiting scroll 66 is located along an offset axis (not shown) of the drive shaft 70.

Figure 2:
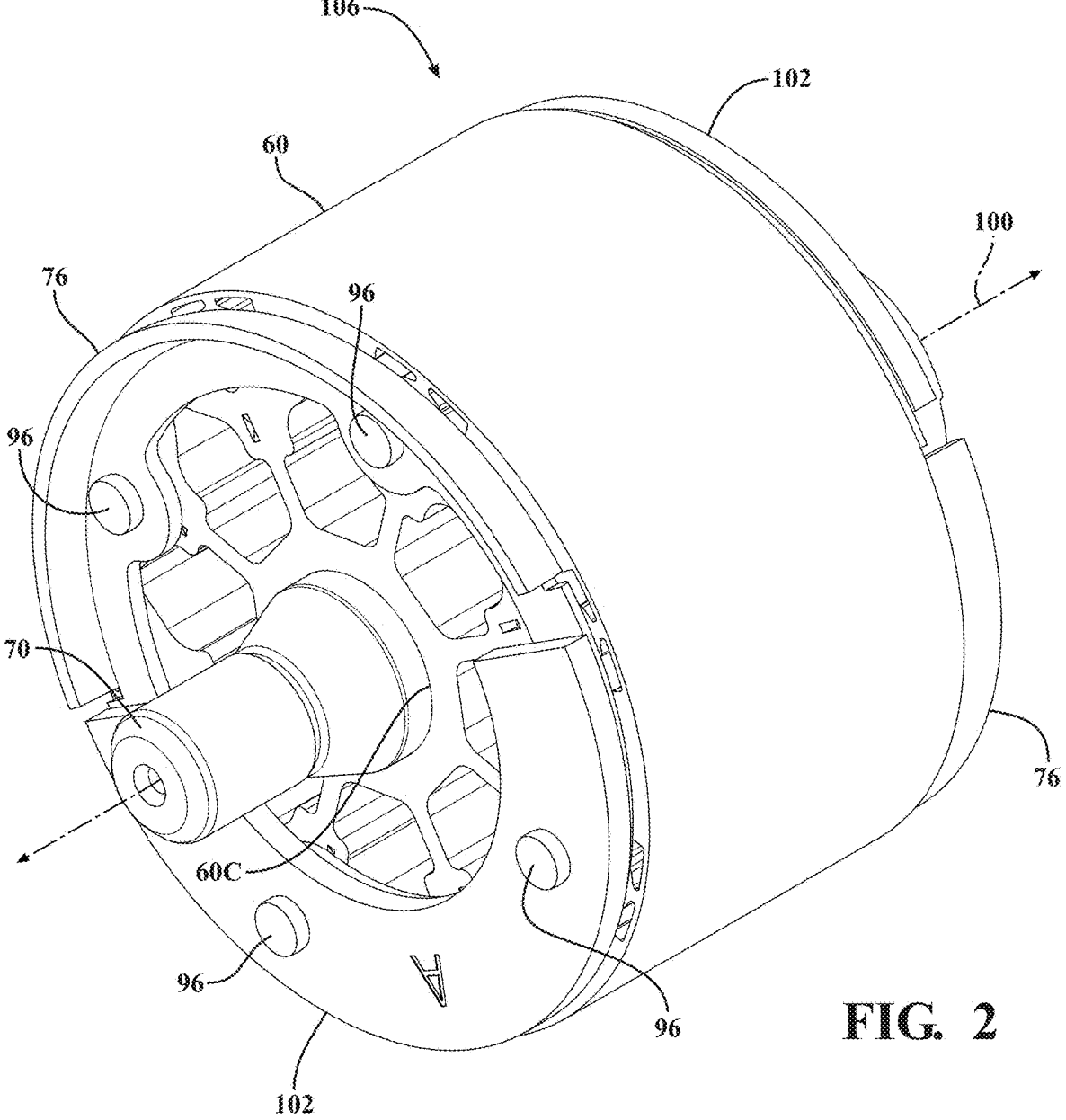
FIG. 2 is a perspective view of a rotor assembly of a permanent magnet motor including a pair of endplates, according to an embodiment of the present invention.
Figure 3:
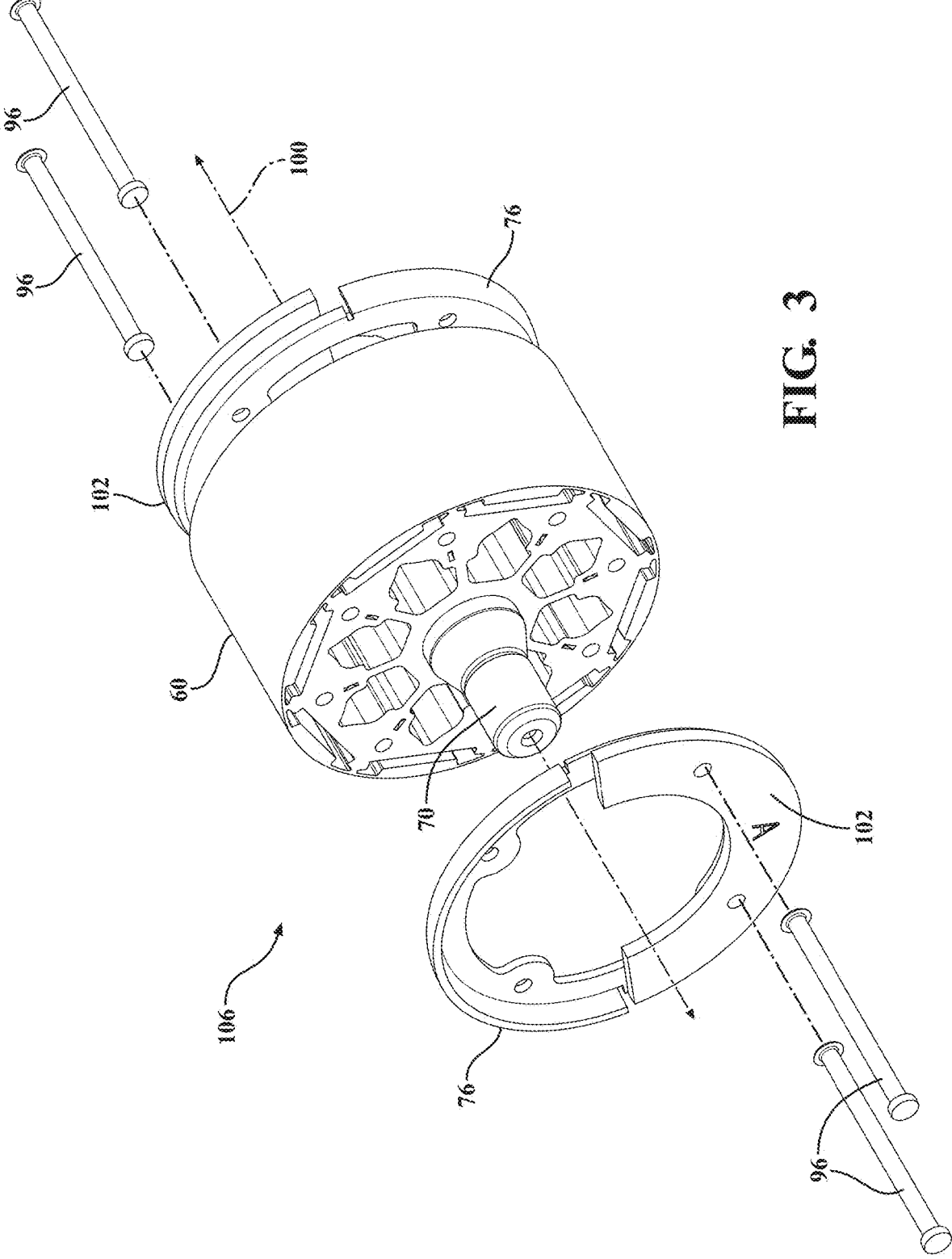
FIG. 3 is an exploded view of the rotor assembly of FIG. 2.
Figures 4A, 4B:
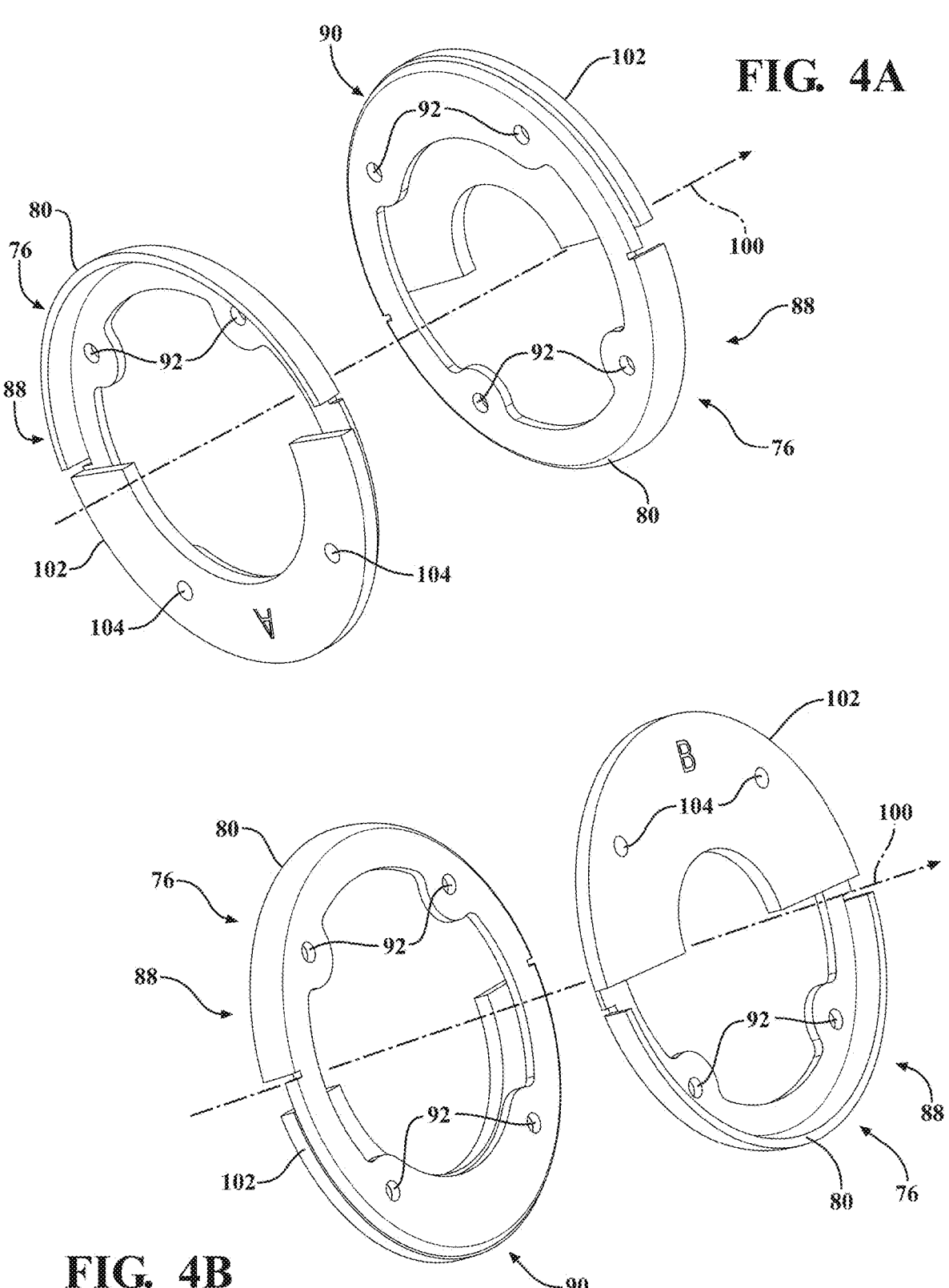
FIG. 4A is a perspective view of the pair of endplates of FIG. 2 and a pair counterweights, according to an embodiment of the present invention.
FIG. 4B is a second perspective view of the pair of endplates and the pair counterweights of FIGS. 2 and 4A.
Figures 5A, 5B:
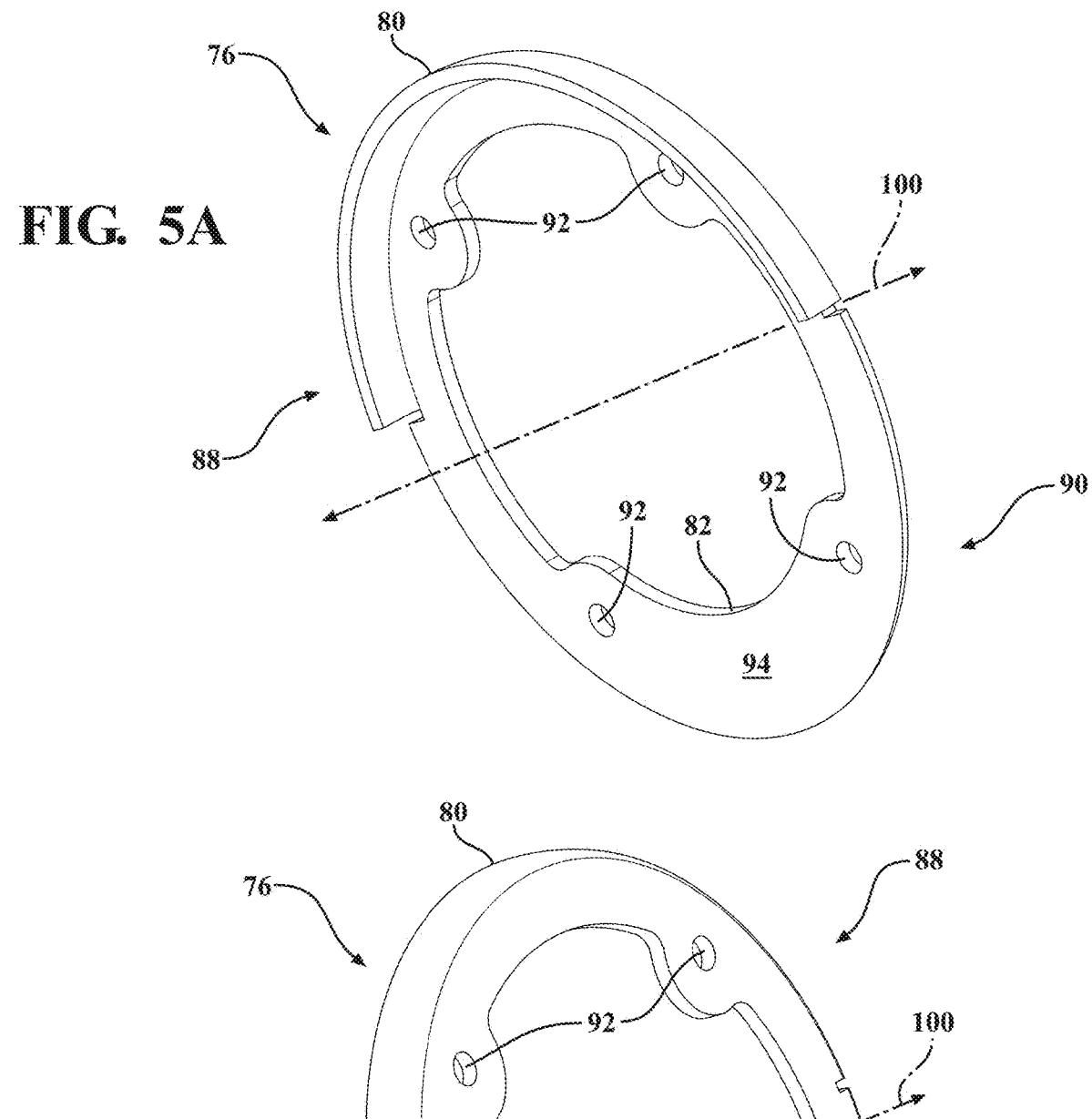
FIG. 5A is a perspective view of one of the endplates of FIG. 2.
FIG. 5B is a second perspective view of the one of the endplates of FIG. 5A.
Figure 6A:
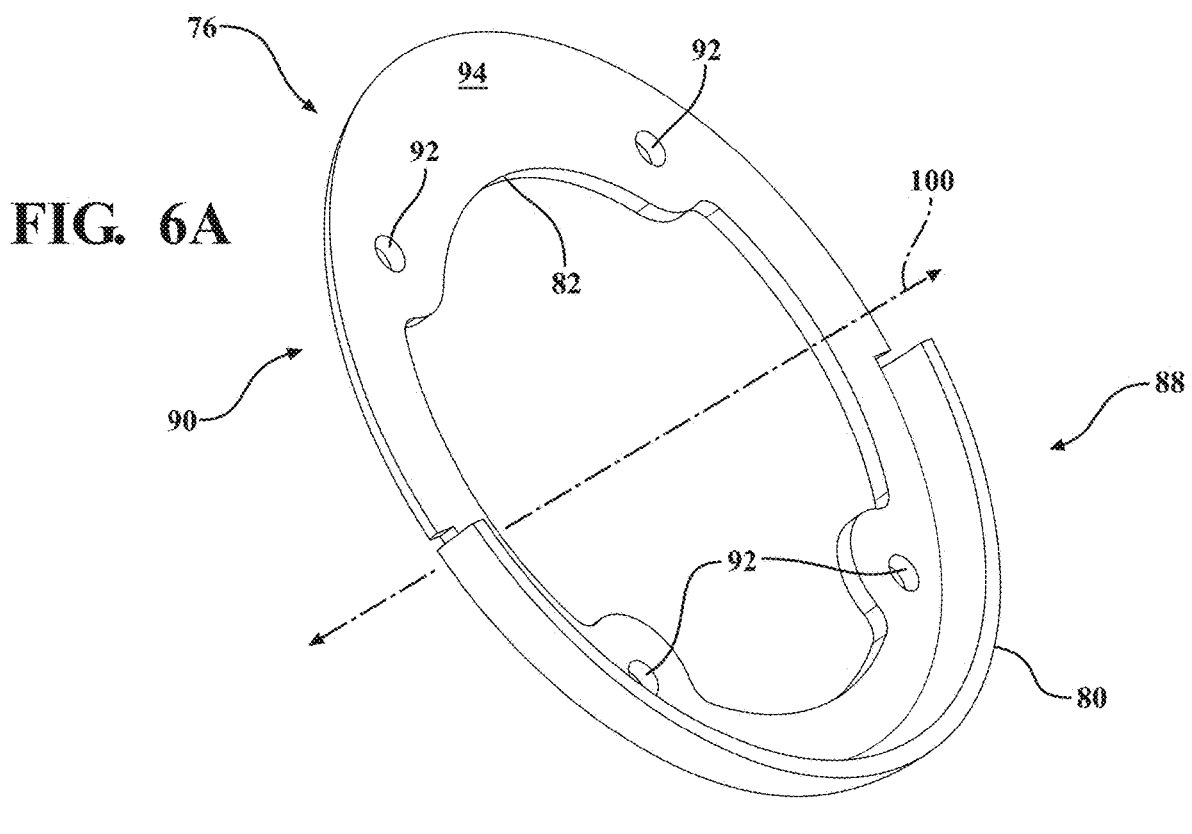
FIG. 6A is a perspective view of another one of the endplates of FIG. 2.
Figure 6B:
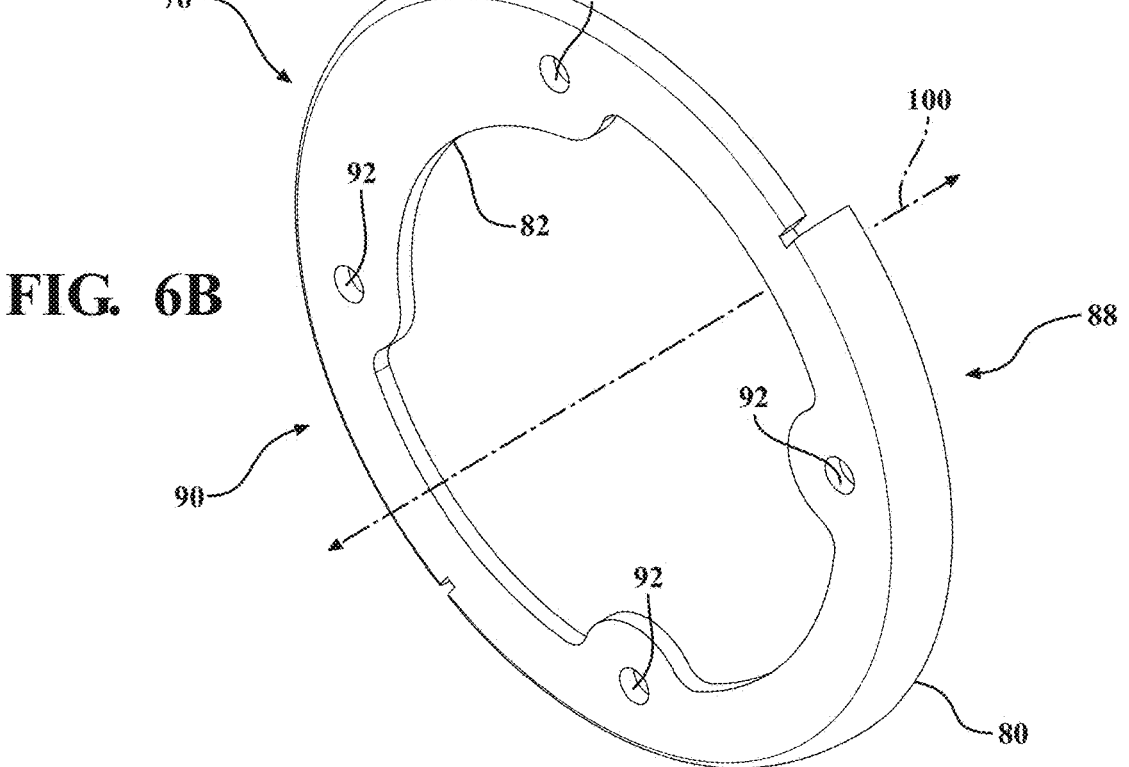
FIG. 6B is a second perspective view of the another one of the endplates of FIG. 6A.

Generally, intermixed refrigerant and oil (at low pressure) enters the electric compressor 10 via a refrigerant inlet port 34 (see for example, FIG. 2A) and exits the electric compressor 10 (at high pressure) via refrigerant outlet port 36 after being compressed by the compression device 18. Refrigerant follows a refrigerant path through the electric compressor 10. Refrigerant enters the refrigerant inlet port and enters an intake volume 74 formed between the motor side of the inverter housing 22 and the center housing 24 adjacent the refrigerant inlet port. Refrigerant is then drawn through the motor section 16 and enters a compression intake volume formed between an internal wall of the fixed scroll 26 and the orbiting scroll 66.

The fixed scroll 26 is mounted within the center housing 24. Refrigerant enters the compression device 18 from the compression intake volume. The fixed scroll 26 and the orbiting scroll 66 form compression chambers 40 in which low or unpressurized (saturation pressure) refrigerant enters from the compression device 18. As the orbiting scroll 66 moves to enable the compression chambers 40 to be closed off and the volume of the compression chambers is reduced to pressurize the refrigerant. At any one time during the cycle, one or more compression chambers 40 are at different stages in the compression cycle. During a cycle of the compressor 10, the refrigerant is transported towards the center of the compression chambers 40.

Returning to FIG. 1, the rear head 28 forms a discharge volume 44. The discharge volume 44 is in communication with the refrigerant output port 36. Pressurized refrigerant leaves the compression device 18 through one or more orifices 48. The release of pressurized refrigerant is controlled by a reed mechanism 68.

With reference to FIGS. 2, 3, 4A-4B, 5A-5B, 6A-6B, and 7, a permanent magnet motor 54 suitable for use in the electric compressor 10 according to an embodiment of the present invention is shown. The housing 12, or a component thereof, may act as the housing 12 for the permanent magnet motor 54. As discussed above, the motor 54 includes the stator 58 and the rotor 60.

The rotor 60 may include a stack of ferromagnetic sheets alternating with insulating layers (not shown). Permanent magnets may be inserted in slots formed in the rotor 60. As discussed in more detail below, a pair of endplates 76 may be positioned at opposite ends of the rotor 60. The rotor 60 and endplates 76 (which may be referred to as a rotor assembly 106) may be held together by a plurality of fasteners 92, such as, rivets.

The rotor 60 is rotarily coupled to the housing 12. As discussed above, the rotor 60 may be supported by the first and second ball bearings 62, 64. The stator 58 is fixedly coupled to the housing 12.

The endplates 76 are located at axial ends of the rotor 60. As shown, each end plate 76 includes a base plate 78, a stiffening portion 80, and a counterweight portion 82. As most clearly shown in FIG. 7, the base plate 78 has a outer circumference 84, an inner circumference 86 and first and second portions 88, 90. Each endplate 76 (and the associated base plate 78) has a center axis 100 which are aligned with each other and the center axis 70C when assembled (see FIGS. 2, 3, 4A-4B, 5A-5B, and 6A-6B). Returning to FIG. 7, the base plate 78 defines or lines within a base plane 98 which is perpendicular to the center axis 100.

The stiffening portion 80 is coupled to the first portion 88 of the base plate 78 and extends in a direction parallel to the center axis 100. As shown, the stiffening portion 80 may radially extend along the outer circumference 84 of the base plate 78 in the first portion 88. The stiffening portion 80 provides resilience to bending forces applied by the fasteners 96 and increases clamping forces applied to the laminated layers of the rotor 60.

Figure 7:
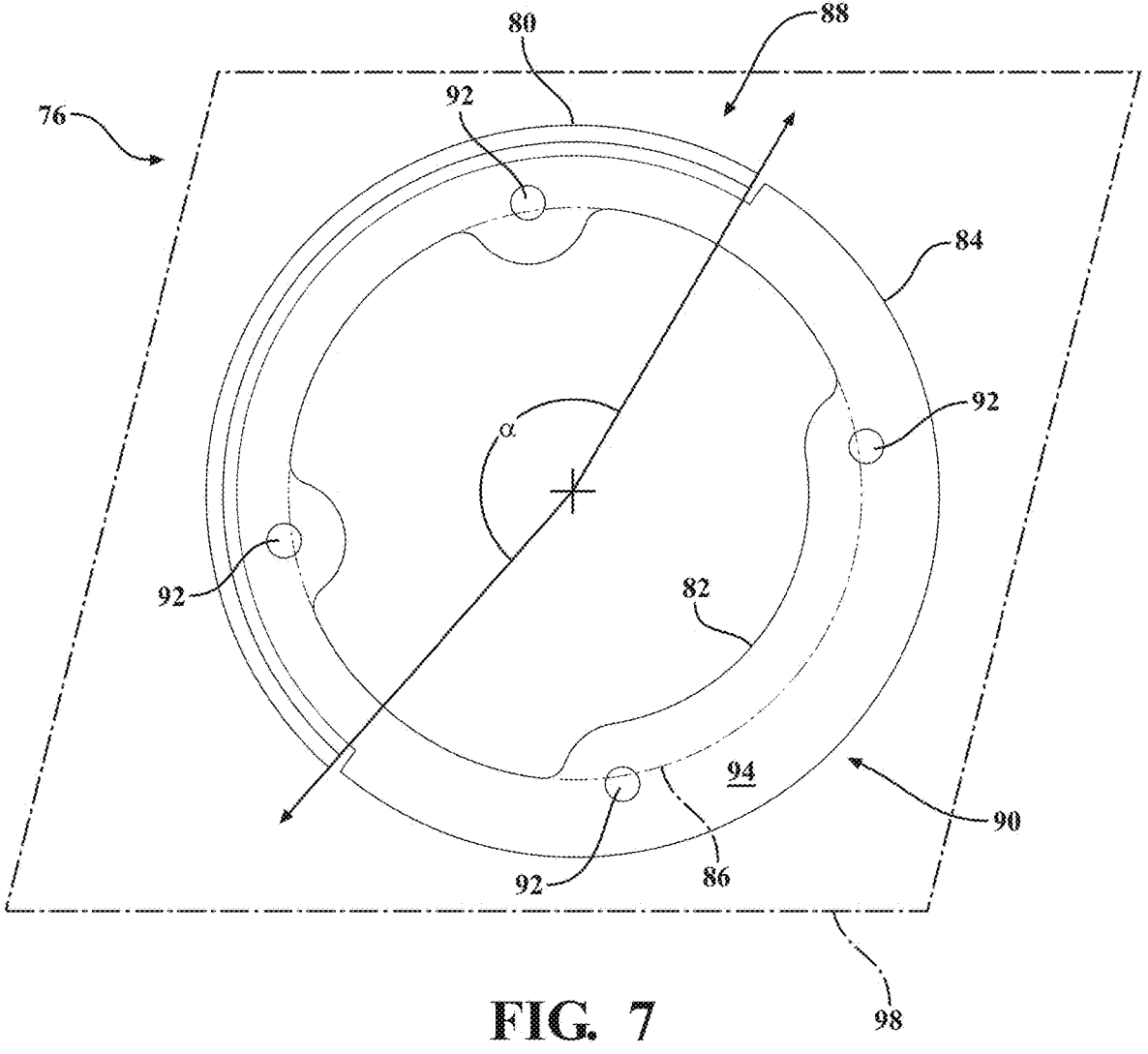
FIG. 7 is a front view of one of the endplates of FIG. 2.

In the illustrated embodiment, the first portion 88 and the stiffening portion 80 extending therefrom have an angular range of a (see FIG. 7). In one embodiment a is less than 180 degrees.

The base plate 78 may also include a counterweight portion 82 which is coupled to, and extends from the inner circumference 86 of the base plate 78 in the second portion 90 toward the center axis 100. In the illustrated embodiment, the counterweight portion 82 is within the base plane 100. The counterweight portion 82 represents adds mass to the rotor assembly 106 to assist in balancing the motor 54 (without adding to the outer dimensions of the rotor assembly 106).

As shown, the first portion 88 and the second portion 90 include at least one aperture 92 configured to receive a respective fastener 96 for mounting the endplate 76 to the rotor 60. In one aspect of the present invention, the endplates 76 of the present invention allow a reduced number of fasteners 96, for example 4, to be used in assembly of the rotor 60.

With reference to FIGS. 2, 3, and 4A-4B, each second portion 90 includes a flat surface 94. The flat surfaces 94 are configured to receive a respective counterweight 102. As shown, each counterweight 102 may be mounted to a respective endplate 76 adjacent the flat portion 94. In the illustrated embodiment, each counterweight has one or more apertures 104 configured to receive a respective one of the fasteners 96.

In another aspect of the present invention, the stiffening portion 80 and the counterweight portion 82 are integral with the base plate 78. The base plate 78, the stiffening portion 80, and the counterweight portion 92 may be formed from a sheet material using a stamping process. The sheet material is a non-ferrous material such as aluminum.

The motor 54, when assembled, the fasteners 96 positioned within respective apertures 92, 104 in the counterweights 102 and endplates 78 on opposites sides of the rotor 60. As shown, the endplate 76 on one end of the rotor 60 may be rotated 180 degrees from the endplate 78 on the opposite side of the rotor 60.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. An endplate for a rotor assembly of a permanent magnet motor, comprising:
   a base plate having an outer circumference, an inner circumference and first and second portions, the base plate having a center axis and defining a base plane perpendicular to the center axis;
   a stiffening portion coupled to the first portion of the base plate and extending in a direction parallel to the center axis, the stiffening portion extends along the outer circumference of the base plate in the first portion; and,
   a counterweight portion coupled to, and extending from the inner circumference of the base plate in the second portion toward the center axis and being in the base plane.

2. The endplate, as set forth in claim 1, wherein the rotor assembly includes a rotor, wherein the first portion and the second portion including at least one aperture configured to receive a fastener for mounting the endplate to the rotor.

3. The endplate, as set forth in claim 2, wherein the second portion includes a flat surface for accepting a counterweight.

4. The endplate, as set forth in claim 3, wherein the stiffening portion and the counterweight portion are integral with the base plate, wherein the base plate, the stiffening portion, and the counterweight portion are formed from a sheet material using a stamping process.

5. The endplate, as set forth in claim 3, wherein the first portion of the base plate has an angular range of less than 180 degrees.

6. A rotor assembly for a permanent magnet motor, comprising:
   a rotor;
   a pair of endplates at opposite axial ends of the rotor, each endplate including:
      a base plate having an outer circumference, an inner circumference and first and second portions, the base plate having a center axis and defining a base plane perpendicular to the center axis;
      a stiffening portion coupled to the first portion of the base plate and extending in a direction parallel to the center axis, the stiffening portion extends along the outer circumference of the base plate in the first portion;
      a counterweight portion coupled to, and extending from the inner circumference of the base plate in the second portion toward the center axis and being in the base plane.

7. The rotor assembly, as set forth in claim 6, wherein the first portion and the second portion including at least one aperture configured to receive a fastener for mounting the endplate to the rotor.

8. The rotor assembly, as set forth in claim 7, wherein each second portion includes a flat surface, the rotor assembly further including a pair of counterweights, each counterweight being mounted to a respective endplate adjacent the flat portion.

9. The rotor assembly, as set forth in claim 8, wherein the stiffening portion and the counterweight portion are integral with the base plate, wherein the base plate, the stiffening portion, and the counterweight portion are formed from a sheet material using a stamping process.

10. The rotor assembly, as set forth in claim 8, wherein the first portion of the base plate has an angular range of less than 180 degrees.

11. A permanent magnet motor, comprising:
    a housing;
    a rotor rotarily coupled to the housing;
    a stator fixedly coupled to the housing;
    a pair of endplates at opposite axial ends of the rotor, each endplate including:
       a base plate having an outer circumference, an inner circumference and first and second portions, the base plate having a center axis and defining a base plane perpendicular to the center axis;
       a stiffening portion coupled to the first portion of the base plate and extending in a direction parallel to the center axis, the stiffening portion extends along the outer circumference of the base plate in the first portion;
       a counterweight portion coupled to, and extending from the inner circumference of the base plate in the second portion toward the center axis and being in the base plane.

12. The permanent magnet motor, as set forth in claim 11, wherein the first portion and the second portion including at least one aperture configured to receive a fastener for mounting the endplate to the rotor.

13. The permanent magnet motor, as set forth in claim 12, wherein each second portion includes a flat surface, the permanent magnet motor including a pair of counterweights, each counterweight being mounted to a respective endplate adjacent the flat portion.

14. The permanent magnet motor, as set forth in claim 13, wherein the stiffening portion and the counterweight portion are integral with the base plate, wherein the base plate, the stiffening portion, and the counterweight portion are formed from a sheet material using a stamping process.

15. The permanent magnet motor, as set forth in claim 13, wherein the first portion of the base plate has an angular range of less than 180 degrees.

16. An electric scroll compressor configured to compress a refrigerant, comprising:
    a housing defining an intake volume and a discharge volume;
    a refrigerant inlet port coupled to the housing and configured to introduce the refrigerant to the intake volume;
    a refrigerant outlet port coupled to the housing and configured to allow compressed refrigerant to exit the electric scroll compressor from the discharge volume;
    a permanent magnet motor mounted inside the housing, the permanent magnet motor including:
       a rotor rotarily coupled to the housing;
       a stator fixedly coupled to the housing;

a pair of endplates at opposite axial ends of the rotor, each endplate including:

a base plate having an outer circumference, an inner circumference and first and second portions, the base plate having a center axis and defining a base plane perpendicular to the center axis;

a stiffening portion coupled to the first portion of the base plate and extending in a direction parallel to the center axis, the stiffening portion extends along the outer circumference of the base plate in the first portion;

a counterweight portion coupled to, and extending from the inner circumference of the base plate in the second portion toward the center axis and being in the base plane;

a drive shaft coupled to the rotor; and, a compression device coupled to the drive shaft and configured to receive the refrigerant from the intake volume and to compress the refrigerant as the drive shaft is rotated by the motor.

17. The electric scroll compressor, as set forth in claim 16, wherein the first portion and the second portion including at least one aperture configured to receive a fastener for mounting the endplate to the rotor.

18. The electric scroll compressor, as set forth in claim 17, wherein each second portion includes a flat surface, the permanent magnet motor including a pair of counterweights, each counterweight being mounted to a respective endplate adjacent the flat portion.

19. The electric scroll compressor, as set forth in claim 18, wherein the stiffening portion and the counterweight portion are integral with the base plate, wherein the base plate, the stiffening portion, and the counterweight portion are formed from a sheet material using a stamping process.

20. The electric scroll compressor, as set forth in claim 18, wherein the first portion of the base plate has an angular range of less than 180 degrees.

* * * * *